United States Patent [19]

Ishido et al.

[11] Patent Number: 4,913,270

[45] Date of Patent: Apr. 3, 1990

[54] CONTROL SYSTEM FOR AN AUTOMATIC TRANSMISSION OF A MOTOR VEHICLE WITH AN ANTILOCK BRAKE SYSTEM

[75] Inventors: Hideki Ishido; Hiroshi Tsukagoshi; Katsumasa Igarashi; Takayuki Ushijima, all of Oota; Ryuzo Sakakiyama; Mitsuo Umezawa, both of Tokyo, all of Japan

[73] Assignee: Fuji Jukogyo Kabushiki Kaisha, Tokyo, Japan

[21] Appl. No.: 390,027

[22] Filed: Aug. 4, 1989

Related U.S. Application Data

[63] Continuation of Ser. No. 205,997, Jun. 13, 1988, abandoned.

[30] Foreign Application Priority Data

Jun. 19, 1987 [JP] Japan ................... 62-153061

[51] Int. Cl.$^4$ ............................................. B60K 41/26
[52] U.S. Cl. .................... 192/4 A; 192/48.3; 192/48.92; 192/103 C
[58] Field of Search .............. 192/4 A, 13 R, 103 C, 192/48.3, 48.9, 48.92; 180/197

[56] References Cited

U.S. PATENT DOCUMENTS

| | | | |
|---|---|---|---|
| 2,080,196 | 5/1937 | Bowen | 192/48.3 |
| 3,637,057 | 1/1972 | Okamoto | 192/13 R |
| 3,974,720 | 8/1976 | Iijima | 192/4 A |
| 4,194,608 | 3/1980 | Usui et al. | 192/0.092 |
| 4,311,062 | 1/1982 | Hamada et al. | 192/48.92 |

FOREIGN PATENT DOCUMENTS

| | | | |
|---|---|---|---|
| 3605600 | 8/1987 | Fed. Rep. of Germany | 192/4 A |
| 821240 | 4/1981 | U.S.S.R. | 192/4 A |

*Primary Examiner*—Leslie A. Braun
*Assistant Examiner*—David A. Testardi
*Attorney, Agent, or Firm*—Martin A. Farber

[57] ABSTRACT

A motor vehicle has an antilock brake system which is provided for preventing wheels from locking, and an automatic transmission of the vehicle has a one-way clutch for transmitting the output of an engine of the vehicle to wheels of the vehicle at acceleration of the engine, and a clutch for transmitting torque from the wheels to the engine, thereby effecting engine braking. A detector is provided for detecting operation of the antilock brake system and for producing a signal. In response to the signal, the clutch is released, thereby rendering the engine braking ineffective.

1 Claim, 2 Drawing Sheets

CONTROL SYSTEM FOR AN AUTOMATIC TRANSMISSION OF A MOTOR VEHICLE WITH AN ANTILOCK BRAKE SYSTEM

RELATED APPLICATION

This application is a continuation of our co-pending application Ser. No. 07/205,997 filed Jun. 13, 1988 now abandoned.

BACKGROUND OF THE INVENTION

The present invention relates to a control system for an automatic transmission of a motor vehicle having an antilock brake system, and more particularly to a system for controlling the transmission when the antilock brake system is in operation.

The antilock brake system is installed on a brake system for wheels of the vehicle. The antilock brake system is provided for preventing the wheels from completely locking at rapid braking or by braking on slippery surfaces such as a snowy road, thereby ensuring directional stability and steering control of the vehicle during the braking operation and improving safety of the vehicle.

However, if the engine braking is effected in the antilock operation, the engine braking force is exerted on the wheels to lock them in spite of the antilock operation. Since the antilock brake system operates to reduce the hydraulic pressure in the system in accordance with the deceleration of the wheel speed, if the wheel speed is disturbed by the engine braking, the efficiency of the antilock brake system is reduced. Thus, it is desired to eliminate the disturbance due to the operation of the driving system, for providing a proper antilock brake system control.

On the other hand, an automatic transmission which is constructed to effect the engine braking in particular ranges in accordance with a position of a shift lever or a selected range is used. Accordingly, it is necessary to control the engine braking operation in the automatic transmission in accordance with the operation of the antilock brake system.

Japanese Patent Application Laid-Open 60-135356 discloses a control system in which the operational range of an automatic transmission is changed to a neutral range when an antilock brake system operates. Namely the power transmitting system from the engine to wheels is disconnected when the antilock brake system is operated. The disconnection of the transmitting system, where the engine braking is not effected, continues as long as the antilock brake system operates. Accordingly, in the case that the coefficient of friction between the tires of the vehicle and the road is small, the vehicle is not effectively braked, resulting in an increase of the stopping distance of the vehicle.

SUMMARY OF THE INVENTION

The object of the present invention is to provide a control system which controls engine braking, thereby providing an effective antilock brake operation and preventing an increase of the stopping distance.

The other objects and features of this invention will become understood from the following description with reference to the accompanying drawings.

DETAILED DESCRIPTION OF THE PREFERRED EMBODIMENT

Figure 1:
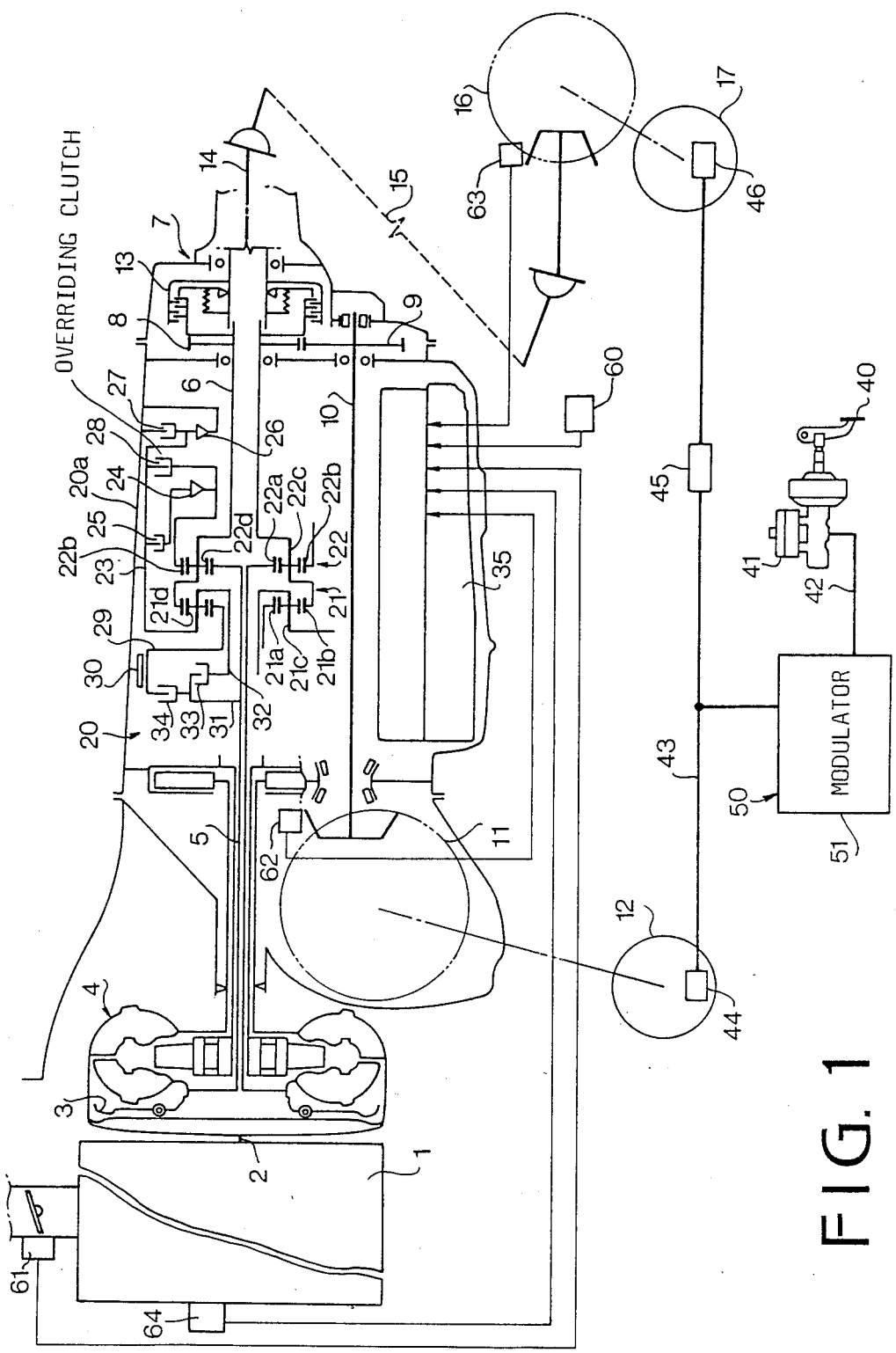
FIG. 1 is a schematic view showing a control system for a transmission system according to the present invention.

Referring to FIG. 1 showing a power transmission system for a four-wheel drive vehicle, an internal combustion engine 1 is mounted on a front portion of the vehicle. A crankshaft 2 of the engine 1 is operatively connected with a torque converter 4 having a lockup clutch 3 at a pump impeller side thereof. A turbine (input) shaft 5 extends from a turbine of the torque converter 4 to an automatic transmission 20. The output of the automatic transmission 20 is transmitted to an output shaft 6 which is aligned with the input shaft 5, for rearwardly transmitting the torque. The output shaft 6 is connected to a front drive shaft 10 which is disposed in parallel under the automatic transmission 20 through a pair of gears 8 to 9 of a transfer device 7. The front drive shaft 10 is in direct connection with front wheels 12 of the vehicle through a final reduction device 11 for the front wheels. The output shaft 6 is connected to a rear drive shaft 14 through a transfer clutch 13. The rear drive shaft 14 is connected to rear wheels 17 through a propeller shaft 15 and a final reduction device 16.

The automatic transmission 20 comprises two sets of single planetary gears consisting of a front planetary gear 21 and a rear planetary gear 22 for providing four forward speeds and one reverse speed. The front planetary gear 21 comprises a sun gear 21a, a pair of planet pinions 21d, a ring gear 21b, and a carrier 21c. The rear planetary gear 22 comprises a sun gear 22a, a pair of planet pinions 22d, a ring gear 22b, and a carrier 22c. The input shaft 5 is engaged with the rear sun gear 22a, and the front ring gear 21b and the rear carrier 22c are connected to the output shaft 6.

Between a connecting element 23 formed integral with the front carrier 21c and the rear ring gear 22b, a first one-way clutch 24 and a forward clutch 25 are disposed in series. A second one-way clutch 26 and a low and reverse brake 27 are disposed in parallel between the connecting element 23 and a transmission case 20a. An overriding clutch 28 is disposed between the connecting element 23 and the ring gear 22b. On a connecting element 29 integral with the sun gear 21a, a brake band 30 is provided. Between a connecting element 31 integral with the input shaft 5 and a connecting element 32 integral with the carrier 21c, a high clutch 33 is mounted. A reverse clutch 34 is provided between the connecting elements 29 and 31. Each of the clutches 25, 28, 33 and 34 is a hydraulically operated multiple-disk clutch.

Figure 2:
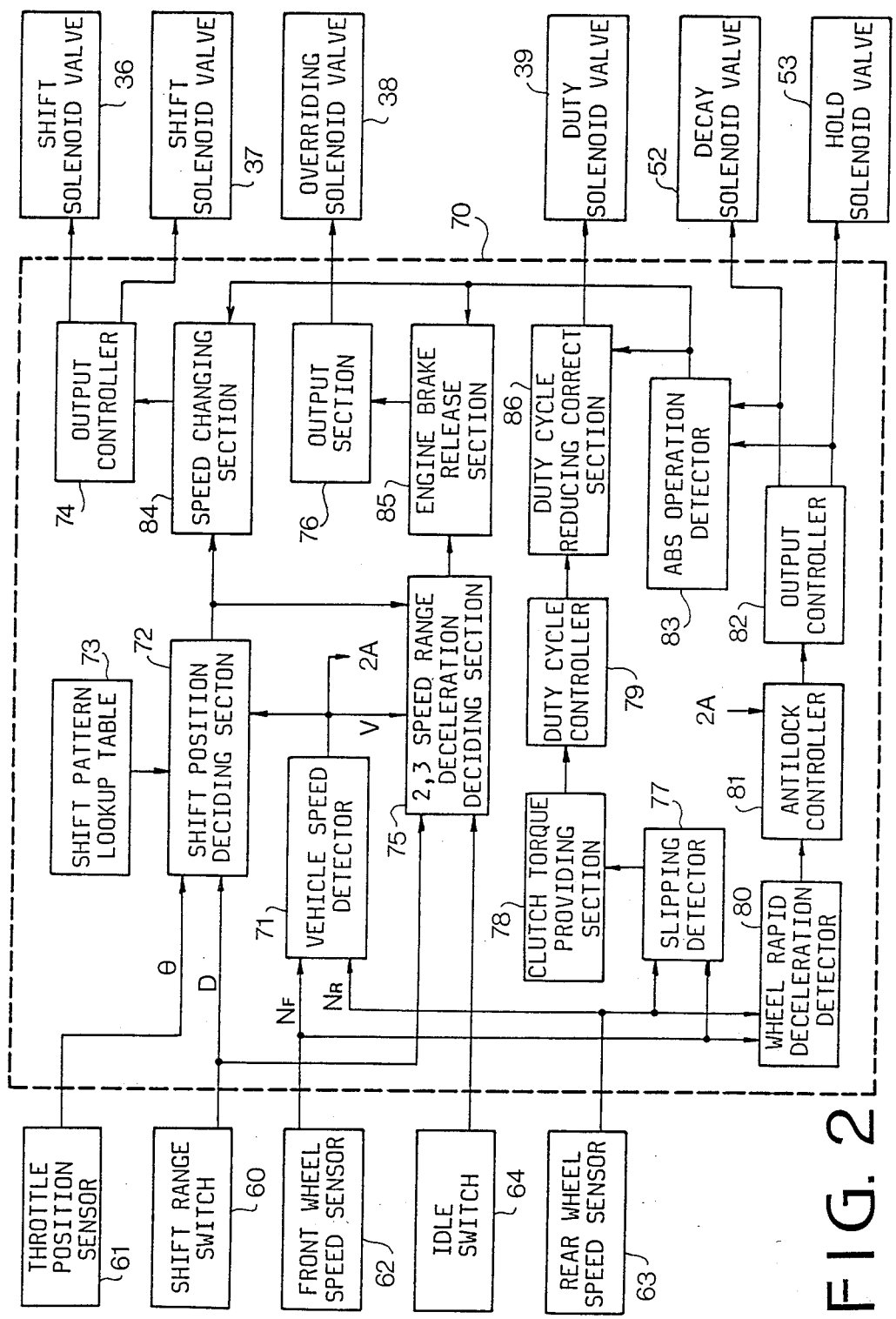
FIG. 2 is a block diagram showing a control unit of the present invention.

In the automatic transmission 20, an electronic hydraulic control device 35 is provided for actuating respective clutches and brakes of the transmission. The transfer clutch 13 is operated by a solenoid operated valve 39 (FIG. 2).

In a first speed of a drive range ($D_1$) or the first speed of a "2" range ($2_1$), the forward clutch 25 is engaged. When the vehicle is accelerated, the ring gear 22b is fixed together with the connecting element 23 by engagement of one-way clutches 24 and 26. Thus, the output of the input shaft 5 is transmitted to the output shaft 6 through the sun gear 22a and the carrier 22c. At coasting of the vehicle, the one-way clutches 24 and 26 become free. Accordingly, regardless of the engagement of the overriding clutch 28, the rotation of output shaft 6 is not transmitted to the engine, so that the engine braking has no effect.

In a "1" range 1st speed ($1_1$), the low and reverse brake 27 and clutch 28 are engaged, so that the ring gear 22b is always locked to effect the engine brake.

In a drive range 2nd speed ($D_2$)) or a "2" range 2nd speed ($2_2$), the forward clutch 25 and the brake band 30 are engaged to lock the sun gear 21a. The rotation of carrier 21c is transferred to the ring gear 22b through the connecting element 23, forward clutch 25, and one-way clutch 24, increased in speed. When the vehicle is decelerated, the overriding clutch 28 is engaged to hold the engagement of the connecting element 23 with the ring gear 22b. Thus, the rotation of the output shaft 6 is transmitted to the engine to effect the engine brake.

In a drive range 3rd speed ($D_3$), the forward clutch 25 and the high clutch 33 are engaged, so that the input shaft 5 is coupled with the ring gear 22b by the high clutch 33 through the connecting elements 31, 32, carrier 21c, connecting element 23, forward clutch 25, and one-way clutch 24. Accordingly, the rear planetary gear 22 is integrated as one unit to directly connect the input shaft 5 with the output shaft 6. At deceleration, the overriding clutch 28 is engaged for restricting the one-way clutch 24, thereby effecting the engine brake.

In a drive range 4th speed ($D_4$), in addition to the drive range 3rd speed ($D_3$) operation, the brake band 30 clamps the sun gear 21a. The ring gear 21b is rotated at higher speed and the rotation is transferred to the output shaft 6. In this range, since the rotation is transmitted without one-way clutches 24, 26, the engine braking is always effected.

In the reverse range (R), the reverse clutch 34 is engaged. The input shaft 5 drives the sun gear 21a. The carrier 21c is fixed together with the connecting element 23 by the engagement of the low and reverse brake 27. The ring gear 21b in the front planetary gear 21 rotates in the reverse direction to drive the output shaft 6 at a large gear ratio, for providing the reverse speed.

The following table shows the operations of the clutches 24, 25 26, 28, 33, 34 and brakes 27, 30 in relation to shift ranges, respectively, as described hereinbefore.

TABLE

| RANGES | CLUTCHES, BRAKES | | | | | | | |
|---|---|---|---|---|---|---|---|---|
| | 34 | 30 | 33 | 25 | 24 | 28 | 27 | 26 |
| R | ○ | | | | | | ○ | |
| P, N | | | | | | | | |
| $D_1$ | | | | | ○ | ◉ | | ○ |
| $D_2$ | | ○ | | ○ | ○ | ▲ | | |
| $D_3$ | | | ○ | ○ | ○ | ▲ | | |
| $D_4$ | | ○ | ○ | | ○ | | | ◉ |
| $2_1$ | | | | ○ | ○ | | | |
| $2_2$ | | ○ | | ○ | ○ | | | |
| 1 | | | | | ○ | ○ | ○ | |

... engaged only at acceleration
▲ ... engaged only at deceleration

Describing brake systems for the front and rear wheels, a brake pedal 40 is connected to a master cylinder 41 for producing fluid pressure in accordance with the depression of the brake pedal. The master cylinder 41 is communicated with a modulator 51 of the antilock brake system 50 through a pipe 42. A pipe 43 from the modulator 51 is communicated with a brake device 44 of the front wheels 12 and with a brake device 46 of the rear wheels 17 through a proportioning valve 45 for adjusting the fluid pressure to the rear wheels 17. The modulator 51 has various valves such as a decay solenoid valve 52 (FIG. 2) for reducing the pressure, and a hold solenoid valve 53 (FIG. 2) for increasing and holding the pressure, so as to control the brake fluid pressure when the antilock brake system is in operation.

Referring to FIG. 2 showing a control system of the present invention, the system has a shift range switch 60, a throttle position sensor 61, a front wheel speed sensor 62 and a rear wheel speed sensor 63 mounted on each of front wheels 12 and rear wheels 17, respectively, of the vehicle for detecting a front wheel speed and a rear wheel speed, and an idle switch 64.

For shift control in the drive range, the front wheel speed signal NF from the sensor 62 and the rear wheel speed signal NR from the sensor 63 are applied to a vehicle speed detector 71 of a control unit 70. The vehicle speed detector 71 selects a wheel speed signal having a smaller variation of speed from the signals NF and NR and calculates vehicle speed V based on the selected wheel speed signal. A drive range signal D from the shift range switch 60, throttle position signal $\ominus$ from the throttle position sensor 61, and the vehicle speed signal V are applied to a shift position deciding section 72. A shift pattern lookup table 73 stores a shift pattern in accordance with the throttle position $\ominus$ and the vehicle speed V. The shift position deciding section 72 determines a shift position in accordance with the data from the table 73. The output signal from the section 72 is applied to an output controller 74 through a speed changing section 84. The output controller 74 produces shift signals for controlling shift solenoid valves 36 and 37 of the hydraulic control device 35 (FIG. 1).

Signals D, V and output signals from the section 72 and the idle switch 64 are applied to a 2nd/3rd speed range deceleration deciding section 75 which produces an engine brake signal at the deceleration when the idle switch 64 is turned on in the 2nd or 3rd range. The engine brake signal is applied to an overriding solenoid valve 38 for the overrunning clutch 28 through an engine brake release section 85 and an output section 76.

In order to control the transfer clutch, a slipping detector 77 is provided for detecting slipping of the wheels in accordance with the difference between the front and rear wheel speeds NF, NR except for the difference caused by the cornering of the vehicle. A detected signal is applied to a clutch torque providing section 78 to calculate the clutch torque in accordance with driving conditions such as steering, slipping, or parking of the wheels. A signal representing the calculated clutch torque is applied to a duty cycle controller 79 wherein the torque is converted into a duty signal in the form of pulses which is applied to a duty solenoid valve 39 through a duty cycle reducing correct section 86.

For the antilock control, a wheel speed rapid deceleration detector 80 applied with wheel speeds NF and NR is provided for detecting wheels which may be locked and the wheel speed thereof at rapid deceleration. An output signal of the detector 80 and the vehicle speed V are applied to an antilock controller 81 for controlling the decay solenoid valve 52 and the hold solenoid valve 53 of the modulator 51 through an output controller 82.

When the wheel speed NF or NR is rapidly reduced, both of the decay solenoid valve 52 and the hold solenoid valve 53 are turned on to reduce the brake fluid pressure. Thereafter the decay solenoid valve 52 is turned off to maintain the pressure. When the wheel speed increases, the hold solenoid valve 53 is turned off to increase the pressure. By repeating this operation, the locking of wheels can be prevented.

An antilock brake system (hereinafter called ABS) operation detector 83 is provided to be applied with the output signal from the output controller 82 to produce an ABS signal. The ABS signal from the detector 83 is applied to the speed changing section 84, engine brake release section 85, and duty cycle reducing correct section 86.

Describing the operation of the control system, when the vehicle is driven in the drive range, the throttle position ⊖ and the vehicle speed V are detected and the shift position is determined at the shift position deciding section 72 in accordance with the data derived from the table 73 for operating the shift solenoid valves 36 and 37. Accordingly, the forward clutch 25, high clutch 33, and the brake band 30 of the automatic transmission 20 are selectively actuated, so that the four speeds are provided as described hereinbefore. The torque is transmitted to the output shaft 6, and further to the front wheels 12 through transfer gears 8, 9.

The slipping detector 77 detects the driving condition in accordance with the front and rear wheel speeds NF, NR and the duty signal is supplied to the duty solenoid valve 39 which operates to determine the clutch torque of the transfer clutch 3. The torque is transmitted to the rear wheels 17. Accordingly, four-wheel driving is established.

At the four-wheel driving in the 4th speed range, the engine brake is always effected by the automatic transmission 0, as described above. At deceleration in the 2nd or 3rd speed range, the engine brake signal from the section 75 is supplied to the solenoid valve 38 for engaging the overriding clutch 28. Thus, the engine brake is similarly effected.

When the brake pedal 40 is depressed during this driving condition, the master cylinder 41 produces the brake fluid pressure which is supplied to the brake systems 44, 46 to brake the wheels. The rapid deceleration detector 80 detects the deceleration condition in accordance with the front and rear wheel speeds NF, NR. At a rapid deceleration, the brake fluid pressure is directly supplied to brake devices 44 and 46.

On the other hand, if the wheels are going to be locked at a rapid deceleration of the wheel speed NF or NR, the antilock controller 81 operates to turn on the decay solenoid valve 52 and the hold solenoid valve 53. Accordingly, modulator 51 of the antilock brake system 50 operates to reduce the brake fluid pressure. On the other hand, the ABS detector 83 detects the operation of the antilock brake system 50 and produces the ABS signal which is supplied to the speed changing section 84 for changing the speed. If the vehicle is driven in the drive range 4th speed (D4), the transmission system is changed to the drive range 3rd speed (D3). The ABS signal from the ABS detector 83 is also fed to the engine brake release section 85 to cancel the engine brake signal, so that the overriding clutch 28 is released to render the engine braking ineffective. The ABS signal is further supplied to the duty cycle reducing correct section 86 for extremely reducing the duty cycle, for reducing the torque of the transfer clutch 13, thereby disengaging the driving mechanism between the front and rear wheels.

Hence, the antilock control of the present invention is performed without disturbances from other driving mechanisms of the vehicle such as the engine brake. The engine 1 is coupled with the front wheels 12 through the transmission 20. Thus, if the speed of output shaft 6 reduces below a lower limit value which is determined by multiplying the speed of input shaft and the transmission ratio together, which is the same state as the acceleration of the vehicle, the torque is transmitted to the front wheels by the one-way clutch 24 for restoring the vehicle speed.

In accordance with the present invention, since when the engine is accelerated, the transmission operates to transmit the output torque of the engine to the wheels, the vehicle speed is rapidly restored.

Particularly, the system effectively operates at driving on slippery roads having a small coefficient of friction.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a control system for an automatic transmission of a motor vehicle having an engine and an antilock brake system for preventing wheels of said vehicle from locking, said transmission having a planetary gear train connected to an input shaft operatively connected to said engine for changing a gear ratio between rotational speeds of said and said wheels, a first one-way clutch connected to said planetary gear train for transmitting output of said engine of the vehicle to the wheels at acceleration of the engine, and an overriding clutch connected to said first one-way clutch for transmitting torque from the wheels to the engine, thereby effecting engine braking, the improvement in the system which comprises:

a sensor for detecting said speed of the wheels and producing a rapid deceleration signal and a normal deceleration signal, respectively;

detector means for detecting operation of the antiblock brake system and for producing an antilock brake signal;

releasing means responsive to the rapid deceleration signal and the antilock brake signal for releasing said overriding clutch to render the engine braking ineffective; and engaging means responsive to said normal deceleration signal for engaging said overriding clutch to effect the engine braking after rapid deceleration so as to provide an effective antilock brake operation and to prevent increase of stopping distance of the vehicle.

* * * * *